United States Patent
Shin et al.

(10) Patent No.: US 7,519,363 B2
(45) Date of Patent: Apr. 14, 2009

(54) ROAMING METHOD BETWEEN WIRELESS LOCAL AREA NETWORK AND CELLULAR NETWORK

(75) Inventors: Yong-Sik Shin, Seoul (KR); Si-Hoon Ryu, Gyeonggi-do (KR); Dong-Hahk Lee, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 179 days.

(21) Appl. No.: 10/512,791

(22) PCT Filed: Nov. 29, 2002

(86) PCT No.: PCT/KR02/02250

§ 371 (c)(1),
(2), (4) Date: Jul. 19, 2005

(87) PCT Pub. No.: WO03/096628

PCT Pub. Date: Nov. 20, 2003

(65) Prior Publication Data

US 2006/0013170 A1    Jan. 19, 2006

(30) Foreign Application Priority Data

May 14, 2002    (KR) .................. 10-2002-0026571

(51) Int. Cl.
*H04Q 7/20*    (2006.01)
(52) U.S. Cl. .................... 455/432.1; 455/439; 455/442; 455/432.3; 455/433; 370/331
(58) Field of Classification Search .............. 455/432.1, 455/432.3, 433, 435.1, 436, 41.2, 442, 439; 370/331
See application file for complete search history.

(56) References Cited

U.S. PATENT DOCUMENTS 5,633,888 A    5/1997    Stewart (Continued)

OTHER PUBLICATIONS

Haverinen, et al., "Authentication and Key Generation for Mobile IP Using GSM Authentication and Roaming", IEEE International Conference on Communications, 2001, vol. 8, pp. 2453-2457.

Wietfeld et al., "Seamless IP-Based Service Integration Across Fixed/Mobile and Corporation/Public Networks", IEEE 49th Vehicular Technology Conference, Jul. 1999, vol. 3, pp. 1930-1934.

(Continued)

*Primary Examiner*—Tuan A Pham
(74) *Attorney, Agent, or Firm*—Lowe Hauptman Ham & Berner, LLP (57) ABSTRACT

The present invention relates to a roaming method between a WLAN and a cellular network which can interwork the WLAN and the cellular network on the basis of a mobile IP system for smooth roaming. In data communication in the WLAN and/or the cellular network using the mobile IP system, the roaming method between the WLAN and the cellular network includes a step wherein a packet data serving node of the cellular network which recognizes allocation of an IP address to a specific mobile terminal notifies information on a current access state of the mobile terminal to an access point managing means of the WLAN located in a current service area of the mobile terminal, a step wherein the access point managing means which the mobile terminal newly accesses requests address renewal to replace an address of the packet data serving node by its address, allocates an IP address to the mobile terminal according to the renewal result, and notifies it to the packet data serving node, and a step wherein the packet data serving node which receives the notification message from the access point managing means transmits data obtained during the roaming due to the movement to the access point managing node, whereby the roaming is performed from the cellular network to the WLAN. In the same manner, the roaming can be performed from the WLAN to the cellular network.

10 Claims, 6 Drawing Sheets

U.S. PATENT DOCUMENTS

| | | | |
|---|---|---|---|
| 6,067,297 | A | 5/2000 | Beach |
| 6,473,413 | B1* | 10/2002 | Chiou et al. ............... 370/331 |
| 6,477,644 | B1* | 11/2002 | Turunen ................... 713/161 |
| 6,795,857 | B1* | 9/2004 | Leung et al. .............. 709/224 |
| 6,954,790 | B2* | 10/2005 | Forslow ................... 709/227 |
| 2001/0024953 | A1* | 9/2001 | Balogh .................... 455/432 |
| 2002/0147008 | A1* | 10/2002 | Kallio ..................... 455/426 |
| 2003/0118015 | A1* | 6/2003 | Gunnarsson et al. ........ 370/389 |
| 2003/0228868 | A1* | 12/2003 | Turanyi et al. ........... 455/432.1 |
| 2004/0022212 | A1* | 2/2004 | Chowdhury et al. ........ 370/329 |
| 2006/0120336 | A1* | 6/2006 | Fantaske .................. 370/338 |

OTHER PUBLICATIONS

Zahariadis et al., "Global Roaming in Next-Generation Networks", IEEE Communication Magazine, Feb. 2002, vol. 40, Issue 2, pp. 142-151.

* cited by examiner

| Field | Length(Byte) | Value |
|---|---|---|
| version | 1 | |
| Identifier | 2 | Message identifier |
| Length | 2 | Packet length |
| Sender IP address | address Length | Current message sender address |
| Client_MAC address | address Length | Currently-accociated client MAC address |
| User ID | ID Length | User ID |
| User NAI | NAI Length | User NAI |
| User password | Password Length | User password |
| Sequence Number | 2 | Sequence nember(0-2048) |
| Others | | |

FIG. 6

| Field | Length(Byte) | Value |
|---|---|---|
| version | 1 | |
| Identifier | 2 | Message identifier |
| Length | 2 | IARP Packet length |
| Sender IP address | address Length | Current sender address |
| Connection context | context Length | Connection registration information |
| Sequence Number | 2 | Sequence nember(0-2048) |
| Others | | |

ROAMING METHOD BETWEEN WIRELESS LOCAL AREA NETWORK AND CELLULAR NETWORK

TECHNICAL FIELD

The present invention relates to a roaming method between a wireless local area network (WLAN) and a cellular network, and in particular to an improved roaming method between a WLAN and a cellular network which can interwork the WLAN and the cellular network on the basis of a mobile IP system for smooth roaming.

BACKGROUND ART

In general, the WLAN service has been distributed in the country and abroad on the basis of IEEE 802.11b standard having a maximal data rate of 11 Mbps by using 2.4 GHz band frequencies. 802.1x is used for user authentication, and standardization of 802.11i for security and 802.11e for quality of service are in progress.

Here, interworking of the WLAN and the cellular network must be considered in order to provide a flexible service by overcoming coverage limits of an access point (AP). Accordingly, a lot of interests have been made on the activation of the WLAN service which has been distributed worldwide and the interworking of the WLAN and cellular network.

The most reliable method for interworking the WLAN and the cellular network is to use a mobile IP. A general method using the mobile IP disconnects a physical layer on a session and re-connects it. It takes a few seconds according to an existing protocol.

However, in order to provide a real time service such as image or voice communication, the disconnection and re-connection time must be reduced as much as possible. That is, when a terminal moves from one network to another, a re-authentication and re-access process for the terminal must be performed in a short time. Therefore, there are strong demands for a roaming method between the WLAN and the cellular network which can reduce a time consumed to support mobility.

DISCLOSURE OF THE INVENTION

Accordingly, it is a primary object of the present invention to provide a roaming method between a WLAN and a cellular network which can support roaming suitable for a real time service by reducing a necessary time for roaming, by rapidly supporting the roaming when a dual mode terminal which can access both the WLAN and the cellular network moves from a WLAN service area to a cellular service area or vice versa.

Another object of the present invention is to provide a roaming method between a WLAN and a cellular network which can prevent data loss as much as possible during roaming because data maintenance is more important in a data service than real time differently from a voice service.

That is, the present invention is intended to embody the roaming method between the WLAN and the cellular network to minimize the data loss and reduce the time for roaming.

In order to achieve the above-described objects of the invention, in data communication in a WLAN and/or a cellular network using a mobile IP system, a roaming method between the WLAN and the cellular network includes a first step wherein a packet data serving node of the cellular network which recognizes allocation of an IP address to a specific mobile terminal notifies information on a current access state of the mobile terminal to an access point managing means of the WLAN located in a current service area of the mobile terminal, a second step wherein the access point managing means which the mobile terminal newly accesses requests address renewal to replace an address of the packet data serving node by its address, allocates an IP address to the mobile terminal according to the renewal result, and notifies it to the packet data serving node, and a third step wherein the packet data serving node which receives the notification message from the access point managing means transmits data obtained during the roaming due to the movement to the access point managing node, whereby the roaming is performed from the cellular network to the WLAN.

According to another aspect of the invention, in data communication in a WLAN and/or a cellular network using a mobile IP system, a roaming method between the WLAN and the cellular network includes a first step wherein an access point managing means of the WLAN which recognizes allocation of an IP address to a specific mobile terminal notifies information on a current access state of the mobile terminal to a packet data serving node of the cellular network located in a current service area of the mobile terminal, a second step wherein the packet data serving node which the mobile terminal newly accesses requests address renewal to replace an address of the access point managing means by its address, allocates an IP address to the mobile-terminal according to the renewal result, and notifies it to the access point managing means, and a third step wherein the access point managing means which receives the notification message from the packet data serving node transmits data obtained during the roaming due to the movement to the packet data serving node, whereby the roaming is performed from the WLAN to the cellular network.

BEST MODE FOR CARRYING OUT THE INVENTION

A roaming method between a WLAN and a cellular network in accordance with a preferred embodiment of the present invention will now be described in detail with reference to the accompanying drawings.

Figure 1:
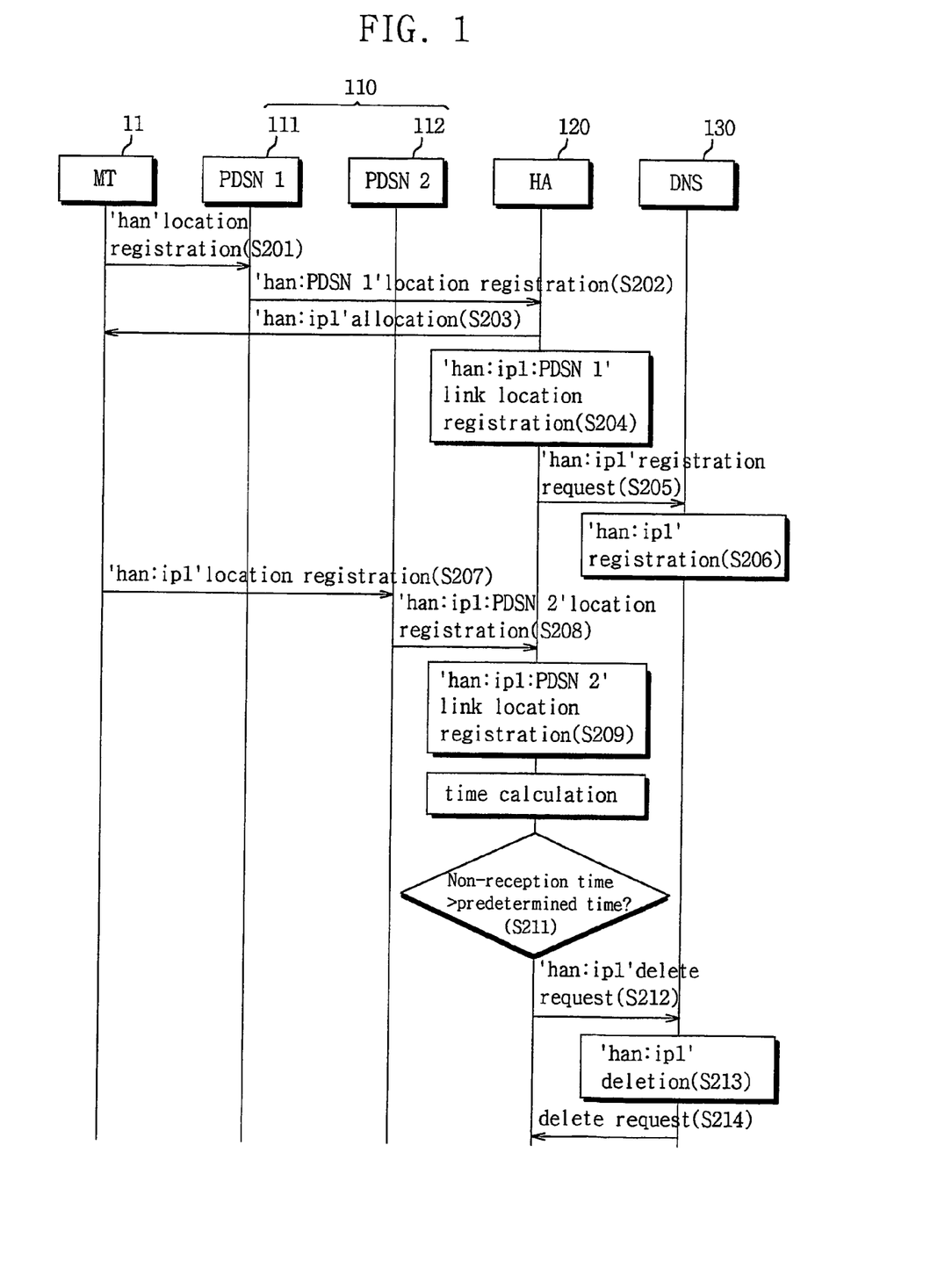
FIG. 1 is a flowchart for explaining a concept of a mobile IP system for the present invention.

FIG. 1 is a flowchart for explaining a concept of a mobile IP system for the present invention. Referring to FIG. 1, packet data serving nodes PDSN1 and PDSN2 (110: 111 and 112) are nodes located in the cellular network which is CDMA 2000 1× network for performing a packet data switching function. A home agent (HA) 120 is a location registration means positioned in the network for registering location upon the location registration request of a mobile terminal (MT) 11 through the PDSN 110. Here, the HA 120 includes a plurality of IP address resources, links them to recognition information of the PDSN 110 and the MT 11 on the basis of the location registration request message, dynamically allocates an IP address, and generates an address registration request message, an address renewal request message and an address delete request message as address renewal messages for renewing the allocated IP address. A domain name server (DNS) 130 is an address managing means for registering, renewing or deleting the address allocated to the MT 11 on the basis of the address renewal message (namely, address registration request message, address renewal request message or address delete request message) from the HA 120.

The concept of the mobile IP system will now be explained with reference to FIG. 1.

When the subscriber MT 11 having a specific host name (han) requests location registration to the HA 120 through the PDSN1 111 (S201 and S202), the HA 120 allocates one of the IP address resources (ipi) to the corresponding MT 11 on the basis of the location registration request message from the PDSN1 (S203), registers location by linking the allocated IP address resource ip1 to the host name han of the MT 11 and the recognition information of the current access PDSN1 111 (S204), and requests IP address registration of han:ip1 to the DNS 130 on the basis of the location registration request message (S205). The DNS 130 registers han:ip1 upon the request (S206).

When the MT 11 accessing the PDSN1 111 and registering its location and IP address resource moves and requests location registration to the HA 120 through the PDSN2 112 with its host name han and allocated IP address ip1 (S207 and S208), the HA 120 recognizes that the PDSN of the registered han:ip1 is changed from the PDSN1 111 to the PDSN2 112 on the basis of the location registration request message from the PDSN2 112, and registers location by linking han:ip1 to the recognition information of the PDSN2 112 (S209).

The HA 120 allocates the IP address resource according to the location registration request message, registers the allocated IP address, confirms reception of the location registration request message for the registered han:ip1, and calculates a non-reception time (S210). When the non-reception time exceeds a predetermined time (S211), the HA 120 requests deletion of the registered han:ip1 to the DNS 130 (S212). The DNS 130 deletes the han:ip1 registration information on the basis of the delete request message (S213), and notifies completion of the deletion to the HA 120 to dynamically allocate the allocated address resource ip1 to another terminal (S214).

Figure 2:
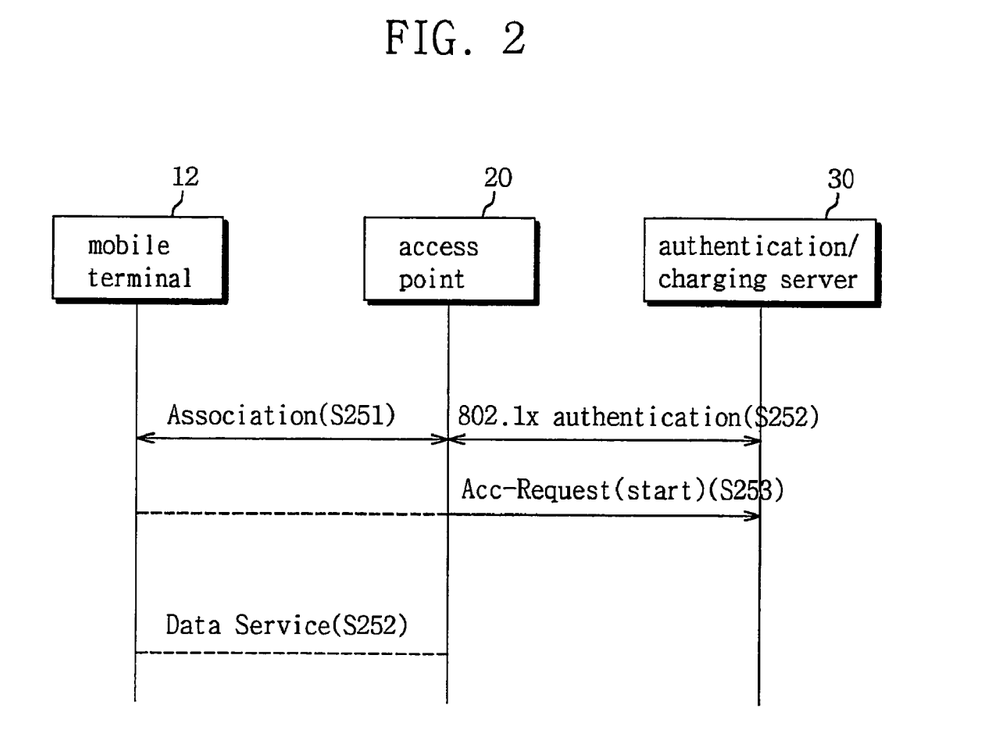
FIG. 2 is a flowchart for explaining a concept when a WLAN interworked with a cellular network operated on the basis of the mobile IP of FIG. 1 is individually operated.

FIG. 2 is a flowchart for explaining a concept when the WLAN interworked with the cellular network operated on the basis of the mobile IP of FIG. 1 is individually operated. In FIG. 2, reference numeral 12 denotes a mobile terminal such as a notebook PC having a WLAN communication function, reference numeral 20 denotes an access point which the mobile terminal 12 wirelessly accesses for communication, and reference numeral 30 denotes an authentication/charging server for authentication and charging during the data communication of the mobile terminal 12.

When the mobile terminal 12 accesses the access point 20 (S251), it is authenticated according to 801.1x authentication procedure through the authentication/charging server 30 (S252). Here, 802.1x is one of the existing methods including MD-5, TLS, SRP and OTP.

After the authentication procedure is finished, the access point 20 transmits a message Acc-Request(start) for notifying charging start to the authentication/charging server 30 to start charging (S253), and provides a data service to the mobile terminal 12 until the access is ended in S251 (S254).

Figure 3:
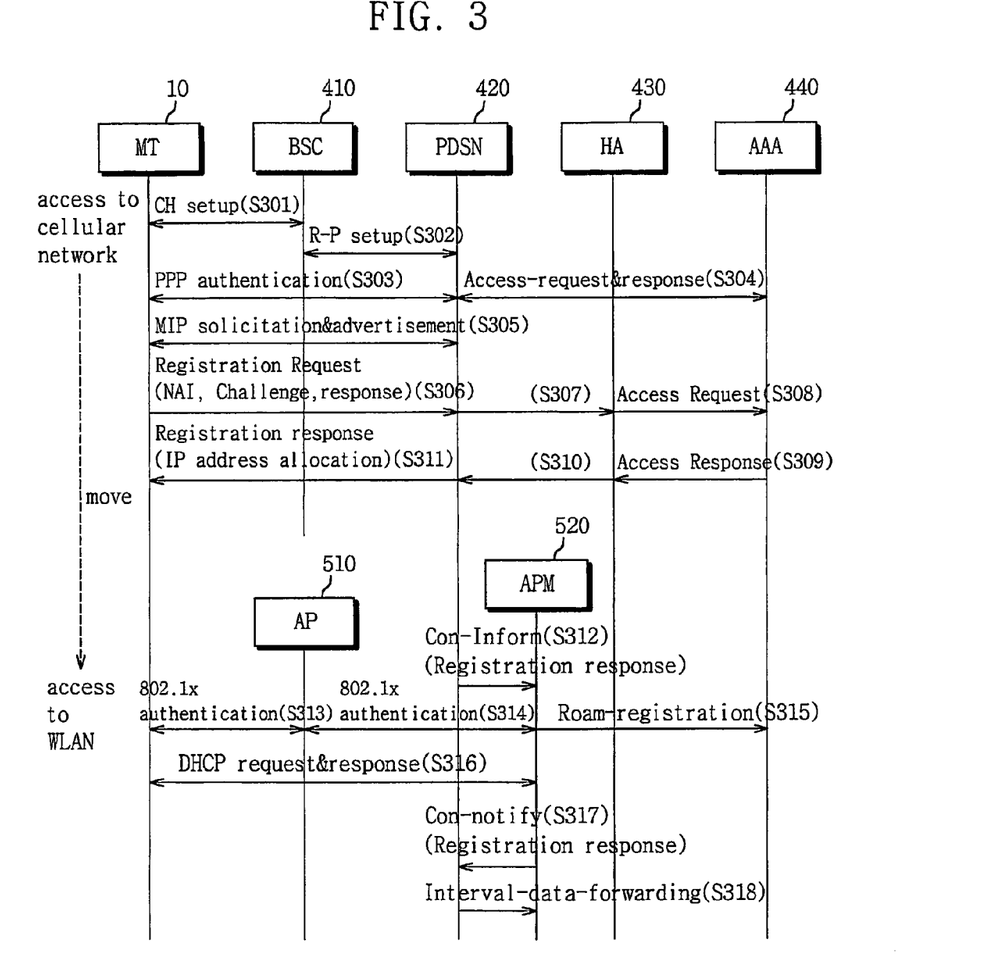
FIG. 3 is a flowchart showing a network interworking method when roaming is performed from the cellular network of FIG. 1 to the WLAN of FIG. 2 in a roaming method between the WLAN and the cellular network in accordance with a preferred embodiment of the present invention.

FIG. 3 is a flowchart showing a network interworking method when roaming is performed from the cellular network of FIG. 1 to the WLAN of FIG. 2 in the roaming method between the WLAN and the cellular network in accordance with the preferred embodiment of the present invention.

Figure 4:
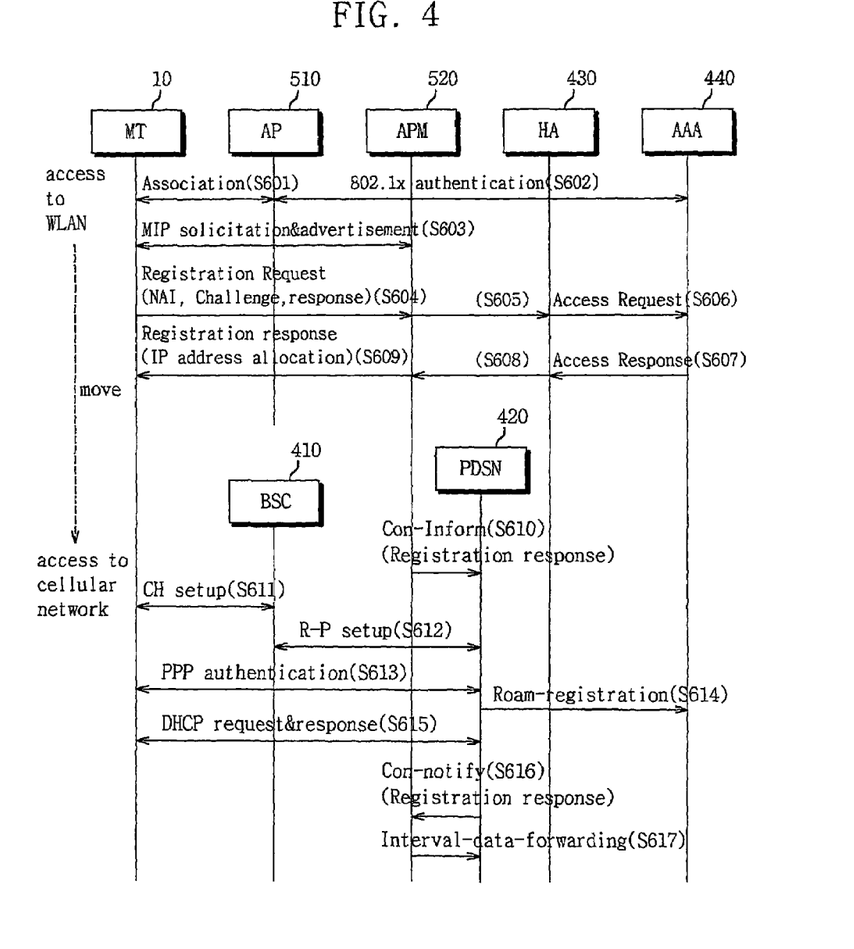
FIG. 4 is a flowchart showing a network interworking method when roaming is performed from the WLAN of FIG. 2 to the cellular network of FIG. 1 in the roaming method between the WLAN and the cellular network in accordance with the preferred embodiment of the present invention.

FIG. 4 is a flowchart showing a network interworking method when roaming is performed from the WLAN of FIG. 2 to the cellular network of FIG. 1 in the roaming method between the WLAN and the cellular network in accordance with the preferred embodiment of the present invention.

In the embodiment of FIGS. 3 and 4, the cellular network is a CDMA 2000 1× network, a base station controller (BSC) 410, a packet data serving node (PDSN) 420 and a home agent (HA) 430 of FIG. 3 denote nodes of the cellular network of FIG. 1, and an access point (AP) 510 and an access point managing device (APM) 520 denote nodes of the WLAN of FIG. 2. The APM 520 which is a node for managing the AP 510 and supporting mobility is newly installed in the WLAN to have a function corresponding to the PDSN 420, and an authentication/charging server (AAA) 440 is a server for authenticating and charging users of the cellular network and the WLAN. In addition, a mobile terminal (MT) 10 is a dual mode terminal which can access both the cellular network of FIG. 1 and the WLAN of FIG. 2, and embody a mobile IP stack. The PDSN 420 and the APM 520 are operated as nodes for performing a mobile IP-based switching function in each network in order to support mobility of the MT 10.

The roaming method from the cellular network to the WLAN will now be explained with reference to FIG. 3.

The MT 10 located in the cellular network performs channel and R-P setup through the BSC 410 including the base station and the PDSN 420. That is, the MT 10 accesses the BSC 410 for performing mutual channel setup (CH setup) (S301), and the channel setup BSC 410 performs mutual R-P setup with the PDSN 420 (S302), which has been disclosed in the prior art.

Thereafter, the MT 10 and the PDSN 420 perform point-to-point protocol (PPP) authentication (S303). Accordingly, the PDSN 420 transmits an access request respectively to the HA 430 and the AAA 440 and receives responses so that the HA 430 and the AAA 440 can perform related functions (S304). This procedure has also been disclosed in the prior art.

The mobile IP stack of the MT 10 performs a predetermined procedure with the PDSN 420 to receive an IP address (MIP solicitation & advertisement) (S305).

After performing a protocol related with the mobile IP in S305, the MT 10 requests location registration to the HA 430 through the PDSN 420 by using a network access identifier (NAI), ID and password (Registration Request) (S306 and S307). The HA 430 transmits an access request message Access Request to the AAA 440 to start charging (S308), and receives a response message Access Response (S309). As a result, when the user authentication and mobile IP registration of the AAA 440 and the HA 430 are successful, the HA 430 allocates the IP address to the MT 10 through the PDSN 420 and the BSC 410 as the response to S306 and S307 (S310 and S311). The procedure of S306 to S311, namely the procedure for the location registration and IP address allocation is identical to the procedure of S201 to S206 except for the process related to the AAA 440, and thus detailed explanations thereof will be omitted.

Figure 5:
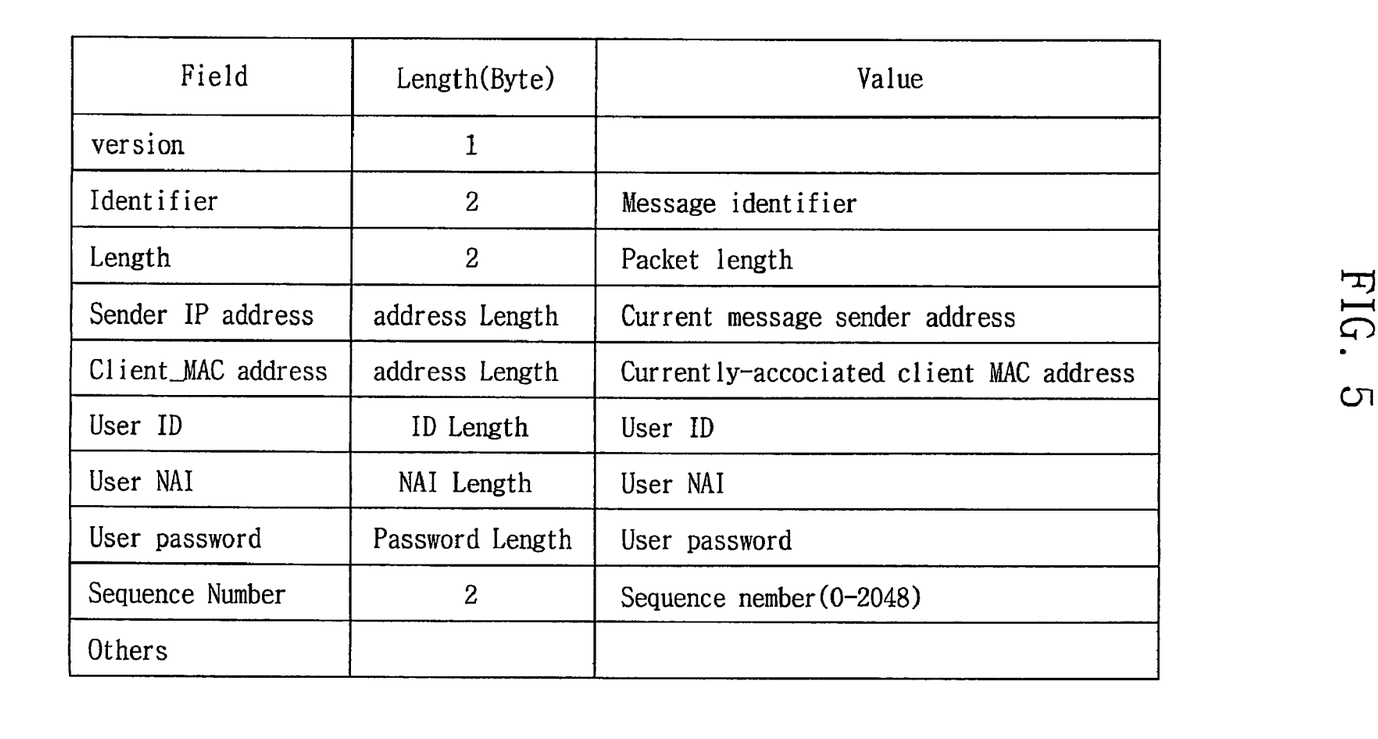
FIG. 5 shows a format of a Con-Inform message generated and transmitted in FIGS. 3 and 4.

The PDSN 420 which the MT 10 currently accesses detects the current location of the MT 10 (namely, base station area) by S311 and the registration response, and notifies the current access state of the MT 10 to the APM 520 which is a managing device for the AP 510 in the area by using a Con-Inform message as shown in FIG. 5 (S312).

Referring to FIG. 5, the Con-Inform message includes a protocol version and its length (for example, 1 byte), a message identifier and its length (for example, 2 bytes), a packet length and its length (for example, 2 bytes), a sender IP address and its length, a client MAC address and its length, a user ID and its length, a user NAI and its length, a user password and its length, sequence numbers from 0 to 2048 and its length (for example, 2 bytes), and others.

When the MT 10 moves to the WLAN area for access, it is authenticated according to 802.1x through the AP 510 and the APM 520 (S313 and S314). Here, when the APM 520 receives the information on the MT 10 in S312, it requests renewal of a binding table to the HA 430 by using its address as a care of address (COA) (Roam Registration) (S315).

Thereafter, the APM 520 transmits the allocated IP address renewed in S315 to manage the MT 10 upon the request of the MT 10 (DHCP request & response) (S316). The address is necessary to transmit data from the APM 520 to the MT 10.

Figure 6:
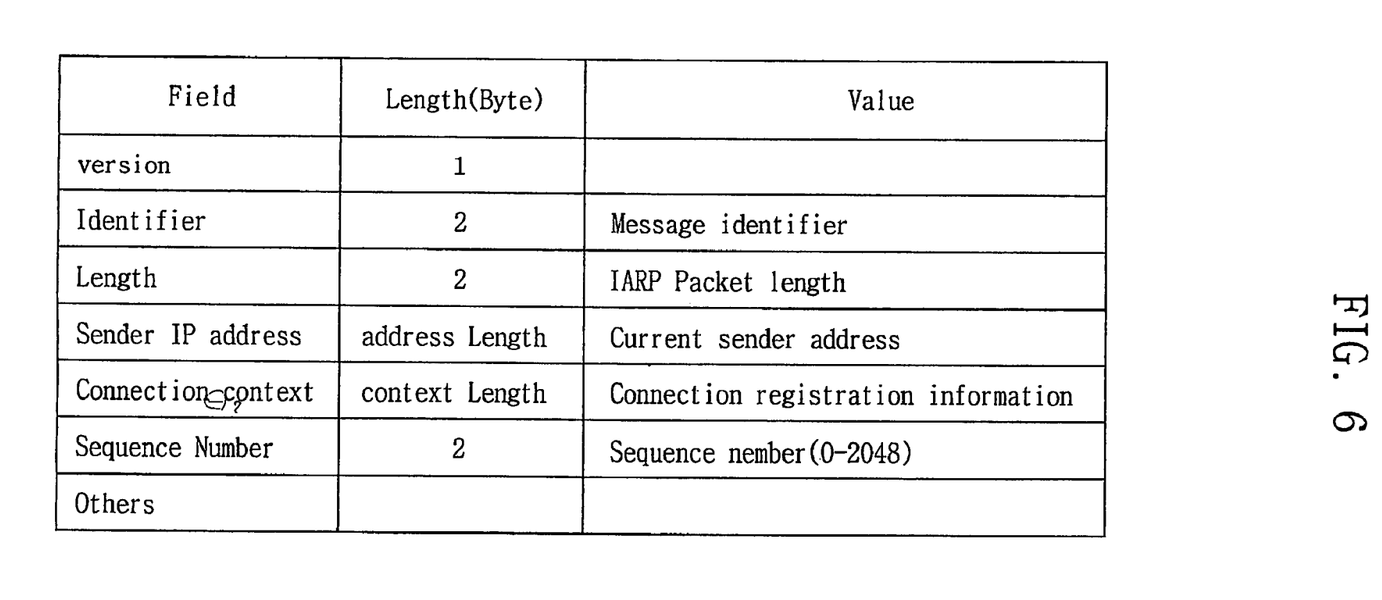
FIG. 6 shows a format of a Con-Notify message generated and transmitted in FIGS. 3 and 4.

The APM 520 notifies that roaming has been performed to the PDSN 420 transmitting data in S312 by using a Con-Notify message as shown in FIG. 6 (S317).

As shown in FIG. 6, the Con-Notify message includes a protocol version and its length (for example, 1 byte), a message identifier and its length (for example, 2 bytes), a packet length and its length (for example, 2 bytes), a sender IP address and its length, a connection context and its length, sequence numbers from 0 to 2048 and its length (for example, 2 bytes), and others.

Finally, the PDSN 420 receiving the Con-Notify message in S317 transmits the data obtained during the roaming to the APM 520 (Interval data forwarding) (S318).

The roaming method from the WLAN to the cellular network will now be explained with reference to FIG. 4.

The MT 10 located in the WLAN accesses the AP 510 (S601), and is authenticated according to 801.1x authentication procedure through the AAA (S602).

The mobile IP stack of the MT 10 performs a predetermined procedure with the APM 520 to receive an IP address (MIP solicitation and advertisement) (S603).

After performing a protocol related with the mobile IP in S603, the MT 10 requests location registration to the HA 430 through the APM 520 by using an NAI value, ID and password (Registration Request) (S604 and S605). The HA 430 transmits an access request message Access Request to the AAA 440 to start charging (S606), and receives a response message Access Response (S607). As a result, when the user authentication and mobile IP registration of the AAA 440 and the HA 430 are successful, the HA 430 allocates the IP address to the MT 10 through the APM 520 and the AP 510 as the response to S604 and S605 (S608 and S609).

The procedure of S604 to S609, namely the procedure for the location registration and IP address allocation is identical to the procedure of S306 to S311. That is, the AP 510 and the APM 520 which are constitutional nodes of the WLAN have similar/identical functions to the base station/BSC 410 and the PDSN 420 which are constitutional nodes of the cellular network.

The APM 520 which the MT 10 currently accesses detects the current location of the MT 10 (namely, AP area) by S609 and the registration response, and notifies the current access state of the MT 10 to the PDSN 420 for the base station/BSC 410 in the area by using the Con-Inform message as shown in FIG. 5 (S610).

When the MT 10 moves to the cellular network area, the MT 10 located in the cellular network performs channel setup and R-P setup through the BSC 410 and the PDSN 420 as in S301 to S303 of FIG. 3 (S611 and S612). Thereafter, the MT 10 and the PDSN 420 perform PPP authentication (S613).

Here, when the PDSN 420 receives the information on the MT 10 in S610, it requests renewal of a binding table to the HA 430 by using its address as a COA (Roam Registration) (S614). It corresponds to S315 of FIG. 3.

The PDSN 420 transmits the allocated IP address renewed in S614 to manage the MT 10 upon the request of the MT 10 (DHCP request & response) (S615). The address is necessary to transmit data from the PDSN 420 to the MT 10.

The PDSN 420 notifies that roaming has been performed to the APM 520 transmitting data in S610 by using the Con-Notify message as shown in FIG. 6 (S616). Finally, the APM 520 receiving the Con-Notify message in S616 transmits the data obtained during the roaming to the PDSN 420 (Interval data forwarding) (S617). The procedure of S615 to S617 corresponds to the procedure of S316 to S318 of FIG. 3.

The aforementioned embodiment is not intended to be limiting. For example, the present invention can be used in 802.11a where a using frequency of the WLAN is 5 GHz band. That is, the present invention may be embodied in several forms without departing from the spirit or essential characteristics thereof.

INDUSTRIAL APPLICABILITY

As discussed earlier, the roaming method between the WLAN and the cellular network can support roaming more suitable for the real time service by reducing the time for roaming, and prevent data loss during the roaming. That is, the present invention can minimize the data loss and reduce the time required for roaming.

What is claimed is:

1. In data communication in a WLAN and/or a cellular network using a mobile IP system, a roaming method between the WLAN and the cellular network, comprising:

a first step wherein a packet data serving node of the cellular network which detects the current location of a specific mobile terminal provides a con-inform message to an access point managing means associated with an access point of the WLAN located in a current service area of the mobile terminal, the con-inform message including information on a current access state of the mobile terminal, wherein the access point managing means is notified of information on a current access state of the mobile terminal prior to the mobile terminal accessing the access point;

a second step wherein the access point managing means associated with the access point which the mobile terminal newly accesses requests address renewal to replace an address of the packet data serving node by its address, allocates an IP address to the mobile terminal according to the renewal result, and provides a con-notify message to the packet data serving node the con-notify message including the IP address; and a third step wherein the packet data serving node which receives the con-notify message from the access point managing means transmits data obtained during the roaming due to the movement to the access point managing means of the WLAN from the packet data serving node of the cellular network, whereby the roaming is performed from the cellular network to the WLAN.

2. In data communication in a WLAN and/or a cellular network using a mobile IP system, a roaming method between the WLAN and the cellular network, comprising:

a first step wherein an access point managing means associated with an access point of the WLAN which detects the current location of a specific mobile terminal provides a con-inform message to a packet data serving node of the cellular network located in a current service area of the mobile terminal the con-inform message including information on a current access state of the mobile terminal, wherein the packet data servicing node is notified of information on a current access state of the mobile terminal prior to the mobile terminal accessing the packet data servicing node;

a second step wherein the packet data serving node which the mobile terminal newly accesses requests address renewal to replace an address of the access point managing means by its address, allocates an IP address to the mobile terminal according to the renewal result, and provides a con-notify message notifies it to the access point managing means, the con-notify message including the IP address; and a third step wherein the access point managing means which receives the con-notify message from the packet data serving node transmits data obtained during the roaming due to the movement to the packet data serving node of the cellular network from the access point managing means of the WLAN, whereby the roaming is performed from the WLAN to the cellular network.

3. The method of claim 1, wherein the notification message of the first step includes a protocol version and its length, a message identifier and its length, a packet length and its length, a sender IP address and its length, a client MAC address and its length, a user ID and its length, a user NAI and its length, a user password and its length, sequence numbers and its length.

4. The method of claim 1, wherein the notification message of the second step includes a protocol version and its length, a message identifier and its length, a packet length and its length, a sender IP address and its length, a connection context and its length, sequence numbers and its length.

5. The method of claim 1, wherein the packet data serving node and the access point managing means perform a mobile-IP based switching function to support mobility of the mobile terminal.

6. The method of claim 1, wherein the mobile terminal is a dual mode terminal which can access both the cellular network and the WLAN and which embody a mobile IP stack.

7. The method of claim 2, wherein the notification message of the first step includes a protocol version and its length, a message identifier and its length, a packet length and its length, a sender IP address and its length, a client MAC address and its length, a user ID and its length, a user NM and its length, a user password and its length, sequence numbers and its length.

8. The method of claim 2, wherein the notification message of the second step includes a protocol version and its length, a message identifier and its length, a packet length and its length, a sender IP address and its length, a connection context and its length, sequence numbers and its length.

9. The method of claim 2, wherein the packet data serving node and the access point managing means perform a mobile-IP based switching function to support mobility of the mobile terminal.

10. The method of claim 2, wherein the mobile terminal is a dual mode terminal which can access both the cellular network and the WLAN and which embody a mobile IP stack.

* * * * *